(12) United States Patent
Bae et al.

(10) Patent No.: US 8,722,204 B2
(45) Date of Patent: May 13, 2014

(54) ALUMINUM COATED STEEL SHEET HAVING EXCELLENT OXIDATION RESISTANCE AND HEAT RESISTANCE

(75) Inventors: Dae-Chul Bae, Pohang-si (KR); Tae-Hun Lim, Pohang-si (KR); Young-Sool Jin, Pohang-si (KR)

(73) Assignee: Posco (KR)

( * ) Notice: Subject to any disclaimer, the term of this patent is extended or adjusted under 35 U.S.C. 154(b) by 0 days.

(21) Appl. No.: 13/824,484

(22) PCT Filed: Dec. 9, 2011

(86) PCT No.: PCT/KR2011/009512
§ 371 (c)(1),
(2), (4) Date: Mar. 18, 2013

(87) PCT Pub. No.: WO2012/091319
PCT Pub. Date: Jul. 5, 2012

(65) Prior Publication Data
US 2013/0280552 A1 Oct. 24, 2013

(30) Foreign Application Priority Data
Dec. 27, 2010 (KR) ........................ 10-2010-0136117

(51) Int. Cl.
*B32B 15/04* (2006.01)
*B32B 15/18* (2006.01)
*B32B 15/20* (2006.01)

(52) U.S. Cl.
USPC ............ 428/653; 428/654; 428/684; 428/336

(58) Field of Classification Search
USPC ......... 428/653, 654, 652, 684, 683, 676, 335, 428/336
See application file for complete search history.

(56) References Cited

U.S. PATENT DOCUMENTS

| 4,729,929 | A | * | 3/1988 | Shinoda et al. | ............... 428/653 |
| 5,789,089 | A | | 8/1998 | Maki et al. | |
| 6,171,644 | B1 | | 1/2001 | Jinno et al. | |
| 6,400,253 | B1 | | 6/2002 | Jinno et al. | |
| 6,673,472 | B2 | * | 1/2004 | Maki et al. | ..................... 428/653 |
| 6,797,410 | B2 | * | 9/2004 | Ishii et al. | ..................... 428/659 |

FOREIGN PATENT DOCUMENTS

| EP | 0743373 A1 | 11/1996 |
| JP | 261544 A | 3/1990 |
| JP | 6108218 A | 4/1994 |
| JP | 8277453 A | 10/1996 |

(Continued)

OTHER PUBLICATIONS

Machine Translation, Hamanaka et al., JP 06-108218, Apr. 1994.*

*Primary Examiner* — Michael E La Villa
(74) *Attorney, Agent, or Firm* — The Webb Law Firm

(57) ABSTRACT

Provided is an aluminum coated steel sheet having excellent oxidation and heat resistance. The aluminum coated steel sheet includes an aluminum coating layer and an alloy layer. The aluminum coating layer is formed on a surface of a steel sheet which includes 0.001 to 0.015 wt % of carbon (C), 0.05 to 0.3 wt % of silicon (Si), 0.1 to 0.6 wt % of manganese (Mn), 0.01 to 0.05 wt % niobium (Nb), 0.01 wt % or less of phosphorus (P), 0.01 wt % or less of sulfur (S), 0.1 wt % or less of soluble aluminum (Al), 0.05 to 0.5 wt % of copper (Cu), 0.05 to 0.5 wt % nickel (Ni), 0.001 to 0.01 wt % of nitrogen (N), and the balance of Fe and inevitable impurities. The alloy layer includes an intermetallic compound at an interface between the steel sheet and the aluminum coating layer.

5 Claims, 1 Drawing Sheet

(a)

(b)

(56) References Cited

FOREIGN PATENT DOCUMENTS

| | | | |
|---|---|---|---|
| JP | 8319548 | A | 12/1996 |
| JP | 2000290764 | A | 10/2000 |
| JP | 2002317258 | A | 10/2002 |
| JP | 2003034854 | A | 2/2003 |
| JP | 2004238657 | A | 8/2004 |
| JP | 2005319481 | A | 11/2005 |

* cited by examiner (a)

(b)

Crack (a)    (b)

ALUMINUM COATED STEEL SHEET HAVING EXCELLENT OXIDATION RESISTANCE AND HEAT RESISTANCE

TECHNICAL FIELD

The present invention relates to a heat-resistant coated steel sheet which can be widely used for vehicle exhaust systems, domestic stove pipe ducts, panels for various domestic heating appliances such as oil boilers, and structural steels, and more specifically, to an aluminum coated steel sheet having excellent oxidation resistance and heat resistance.

BACKGROUND ART

Aluminum coated steel sheets, prepared aluminum-silicon alloy coating onto cold rolled steel sheets, combine the corrosion resistance, heat resistance, attractiveness and thermal reflection properties of aluminum; and the mechanical and other physical properties of a cold rolled steel sheet itself and are widely used in automobiles, electrical appliances, building materials, and so on.

In terms of methods for meeting formability, heat resistance, discoloration resistance and oxidation resistance, there is a technique in which alloying elements are added to a steel to facilitate alloying between an steel substrate and an aluminum coating layer, thereby producing a thermally stable layer, and at the same time, retaining high heat resistance through the stable oxide layer produced on the coating layer. There is also provided a technique in which special elements are added to the steel substrate to provide the coating layer with sacrificial anti-corrosion, thereby improving the corrosion resistance of the steel substrate as well as significantly lengthening the corrosion resistance life of the entire coating layer.

A temperature allowing for the use of an aluminum coated steel sheet without the discoloration thereof is about 400° C., approximately 100 to 150° C. higher than that of a hot dip galvanized steel sheet, and, due to advances in industry, there is a need to develop components which require improved durability and heat resistance in higher temperature conditions than conventional heat resistant temperatures.

There are also a need for yield strength at high temperatures of about 600-700° C. to be above a certain level, and a need for the steel sheet to secure the adhesion of the aluminum-steel alloy layer and have good oxidation resistance, despite repetitive heat treatments at 800° C.

To meet such needs, research into the manufacturing of a heat-resistant steel sheet has been proceeding to improve high temperature heat resistant properties such as high temperature strength, oxidation resistance, discoloration resistance, and corrosion resistance. In order to achieve the objective, Japanese Patent Application Laid-open No. HEI 2-61544 discloses a method for adjusting soluble N and Al contents contained in steel, and performing a heat treatment after coating. However, there are limitations, in the addition of a process and possibility of aging due to the difficulty in adjusting the addition amounts.

In addition, Japanese Patent Application Laid-open No. HEI 8-319548 discloses a method for hot dip aluminizing in which an intermetallic compound layer having the composition of Fe, Mn, Si, Cr, and the like in specific ratios is coated onto the surface of the steel sheet in a coating bath to which Mn and Cr are simultaneously added at to conventional Al and Si coating bath components. However, there is a limitation in the method disclosed above, in that the coating bath composition should be changed, and there may be inconvenience in adjusting the composition of the coating layer surface.

In addition, Japanese Patent Application Laid-open No. 2000-290764 discloses a method for producing a hot dip aluminum coated steel sheet having excellent blackening resistance after heat treatment, in which coating is performed while adjusting the soluble N content in a steel substrate; a special chromate post-treatment is performed; a reheating treatment at about 300 to 500° C. is performed; and then Al of the coating layer and soluble N in steel are allowed to react to produce AlN at the interface between the coating layer and the steel substrate. However, this method has a limitation in that it may be complicated due to the addition of a process and there is the possibility of aggravated blackening when the strength of the steel substrate is increased or the post-treatment solution is ill-managed.

Reducing the Si content and adding Mn, Cu, and Mg elements to an Al coating bath is disclosed in Japanese Patent Application Laid-open No. 2004-238657, while Japanese Patent Application No. 2003-034854A discloses that the addition of Cr induces a change in the microstructure of the coating layer, thereby improving corrosion resistance. However, there is a limitation that the added elements in the coating bath may increase the viscosity of the surface of the coating bath such that it may be significantly difficult to adjust the concentration of Cr at a constant level and a general coating operation may not be able to be carried out at high speed.

An aspect of the present invention provides an aluminum coated steel sheet in which heat resistance and oxidation resistance of the aluminum coating layer are improved by controlling the composition thereof and forming an alloy layer at the interface between a steel substrate and the coating layer.

SUMMARY OF THE INVENTION

According to an aspect of the present invention, there is provided an aluminum coated steel sheet having excellent oxidation resistance and heat resistance, the aluminum coated steel sheet including: an aluminum coating layer formed on a surface of a steel sheet which includes 0.001 to 0.015 wt % of carbon (C), 0.05 to 0.3 wt % of silicon (Si), 0.1 to 0.6 wt % of manganese (Mn), 0.01 to 0.05 wt % niobium (Nb), 0.01 wt % or less of phosphorus (P), 0.01 wt % or less of sulfur (S), 0.1 wt % or less of soluble aluminum (Al), 0.05 to 0.5 wt % of copper (Cu), 0.05 to 0.5 wt % nickel (Ni), 0.001 to 0.01 wt % of nitrogen (N), and the balance of Fe and inevitable impurities; and an alloy layer which includes an intermetallic compound at an interface between the steel sheet and the aluminum coating layer.

Because the aluminum coated steel sheet of the present invention has excellent high temperature strength and oxidation resistance and exhibits superior adhesion at high temperatures, the coating layer can be stable after heat treatment of the steel sheet at temperatures up to 800° C. Therefore, it can be applied to a wide range of products such as panels for various domestic heating appliances like oil stoves, clad materials for domestic appliances such as electric rice cookers and frying pans, and so on. In addition, the present invention allows the manufacturing of a formable steel sheet with a tensile strength of 350 MPa or more, and thus, resistant characteristics can be greatly improved when used for applications which require tensile strength such as vehicle exhaust systems, heat exchangers for domestic electrical appliances, and structural steels.

DETAILED DESCRIPTION OF THE INVENTION

Figure 1:
FIG. 1(a) and FIG. 1(b) are photographs showing cross-sectional microstructures of the coating layers of the inventive steel 1 and the comparative steel 1 after heat treatments at high temperature.
Figure 1:
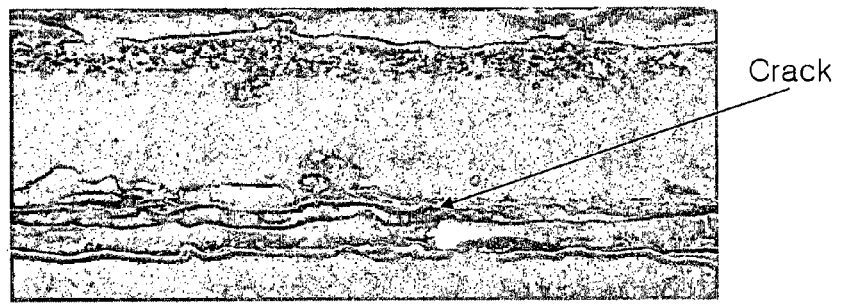

Hereinafter, the present invention will be described in detail.

First, the composition of the steel sheet according to the present invention will be explained. As used herein, percentages (%) of components of the composition are weight percentages.

Carbon (C) may be preferably present in an amount of 0.001% to 0.015%. C is an element for enhancing the strength of the steel sheet and may be preferably present in an amount of 0.001% or more to secure tensile strength of 300 MPa or more. A carbon content higher than 0.015% causes cracking or like during forming deep drawable parts and makes the manufacturing of deep drawable parts difficult. Therefore, the upper limit of the carbon content may preferably be about 0.015%.

Silicon (Si) may preferably be present in an amount of 0.05% to 0.3%. Si is a substitutional solid-solution strengthening element and contributes to an increase in the strength of the steel sheet and an improvement in the heat resistance of the coating layer. When the Si content is more than 0.3%, a stable oxide thin film may be generated during recrystallization heat treatment so that adhesion may be inhibited and there may be a difficulty in removing surface oxides from a hot-rolled steel sheet. When the Si content is less than 0.05%, the heat resistance improving effect and fatigue characteristics may be deteriorated. Therefore, the Si content may preferably be limited to the range of 0.05% to 0.3%.

Manganese (Mn) may preferably be present in an amount of 0.1% to 0.6%. Mn is an element which has a significant solid-solution strengthening effect and retards the transformation from austenite to ferrite. In addition, Mn plays a role in preventing hot brittleness caused by the inevitably added S and increasing heat resistance after Al coating. When the Mn content is less than 0.1%, a high temperature is required for the heat treatment of the steel sheet in an austenite single-phase region. This high temperature accelerates the oxidation of the steel sheet and adversely affects the corrosion resistance of the steel sheet even though the steel sheet may be coated. In addition, it is difficult to attain a desired high strength by heat treatment in a ferrite-austenite two-phase region. Meanwhile, when the Mn content is more than 0.6%, there are dangers that the steel sheet may suffer from poor adhesion, weldability, surface appearance, and impact properties. Therefore, the Mn content may preferably be limited to the range of 0.1% to 0.6%.

Sulfur(S) may preferably be present in an amount of 0.01% or less (except for 0%). S is an impurity element present in the steel and inhibits the ductility and weldability of the steel sheet. When the S content is 0.01% or less, the negative effects are not so large. Thus, the upper limit of the S content may preferably be about 0.01%.

Soluble aluminum (soluble Al) may preferably be present in an amount of 0.1% or less (except for 0%). The soluble Al is a deoxidizing element. When the Al content exceeds 0.1%, the deoxidation effects are saturated; inclusions such as alumina are increased; and Al may be combined with N to form AlN, thereby resulting in a decrease in the amount of dissolved N and an inhibition of an increment in yield strength. Therefore, the upper limit of the soluble Al content may preferably be about 0.1%.

Nitrogen (N) may preferably be present in an amount of 0.001% to 0.01%. N is an interstitial strengthening element and combines with titanium (Ti), niobium (Nb), and aluminum (Al) to form nitrides. In the present invention, N is added in an appropriate amount in order to maintain strength after heat treatment. When the N content is less than 0.001%, the above effects are not expected. When the N content is more than 0.01%, it may be difficult to dissolve and cast the steel sheet and deterioration in the formability of the steel sheet and an occurrence of blow holes during welding may be undesirably caused. Thus, the upper limit of the N content may preferably be about 0.01%.

Copper (Cu) may preferably be present in an amount of 0.05% to 0.5%. Cu is an element which is not easier to be oxidized than Fe and plays a role in improving coatability. When Cu is added in an amount of 0.2% or more, it plays a role in improving the corrosion resistance of the steel substrate. In addition, Cu exhibits barrier properties at the alloy layer/steel substrate interface, so that it contributes to improvements in heat resistance and discoloration resistance. When the Cu content is less than 0.05%, it is difficult to expect a heat resistance improving effect, while when the Cu content is more than 0.5%, such effects are saturated and production costs are increased. Thus, the upper limit of Cu content may preferably be about 0.5%.

Nickel (Ni) may preferably be present in an amount of 0.05% to 0.5%. Like Sn and Cu, Ni is added so as to improve corrosion resistance of the steel substrate and the coating layer. Since Ni also contributes to improvements in heat and discoloration resistance, its effects are great. When the Ni content is less than 0.05%, there is no significant increase in the heat resistance improving effect. When the Ni content is more than 0.5%, such effects are saturated and production costs are increased. Thus, the upper limit of the Ni content may preferably be about 0.5%.

Niobium (Nb) may preferably be present in an amount of 0.01% to 0.05%. Nb is an effective element in improving the strength of the steel sheet, reducing the grain size and heat treatability thereof. Nb reacts with N first and is added so as to form Nb(CN). When the Nb content is less than 0.01%, it may be difficult to achieve such effects. When the Nb content is more than 0.05%, production cost is increased and the strength is increased due to the production of excessive carbides and nitrides, so that it is difficult to expect the formability improving effect. Therefore, the Nb content may be preferably limited to the range of 0.01% to 0.05%.

The remainder may include Fe and inevitable impurities.

The aluminum coated steel sheet of the present invention includes an aluminum coating layer and the aluminum coated steel sheet includes an alloy layer which includes an intermetallic compound at the interface between the steel sheet and the coating layer. For the intermetallic compound, a Cu—Ni—Fe(—Al—Si)-based intermetallic compound may be preferable. The alloy layer plays a role in inhibiting the Fe diffusion of the steel sheet and reducing the diffusion of Al of the coating layer during a heat treatment at high temperature. The alloy layer improves adhesion of the steel sheet and the coating layer at room temperature, and at the same time, forms a uniform texture on the surface layer after heat treatment at high temperature and inhibits the formation of the porous Al—Fe alloy layer, thereby improving adhesion at high temperature.

In other words, the Cu—Ni—Fe(—Al—Si)-based intermetallic compound exists between the steel substrate and the coating layer of the steel sheet during hot dipping process, thereby playing a role in reducing the Fe concentration in the intermetallic compound by inhibiting the migration of Al to the steel substrate of the steel sheet and inhibiting the Fe diffusion into the coating layer, and consequently, the Cu—Ni—Fe(—Al—Si)-based intermetallic compound improves adhesion of the steel substrate and the coating layer.

The thickness of the alloy layer may preferably be about 3 μm or less. When the thickness of the alloy layer is thicker than 3 μm, the formability of the aluminum coated steel sheet is deteriorated. Thus, the thickness may be preferably not more than 3 μm.

Preferably, the Al coating layer may include Al as a main component and Si in an amount of 5 to 11 wt %. Si is an element which inhibits the diffusion of Al in the alloy layer into the steel substrate, thereby making the thickness of the alloy layer thin. In order to achieve such effect, Si is included in an amount of 5 wt % or more. However, when the amount thereof is more than 11 wt %, the Al alloy layer is so hardened that the formability is deteriorated and the increase in the temperature of the hot-dipping bath is required, thereby causing difficulty in the coating operation. Thus, the upper limit may be preferably 11 wt %. Meanwhile, the Al coating layer may include Fe preferably in an amount of 10 wt % or less.

Preferably, the Al coating layer may have a thickness in the range of about 10 to 30 μm. When the thickness is too thin, corrosion resistance after coating is deteriorated. When the thickness is too thick, weldability and formability may be deteriorated. In particular for formability, during press forming after heating at high temperature, the intermetallic compound exhibits brittleness and peeling may occur easily. Thus, the coating thickness may be preferably about 10 to 30 am.

Hereinafter, a manufacturing method of the present invention will be described in detail.

By reheating a steel slab satisfying the steel composition defined above, subjecting the reheated steel slab to hot rolling and coiling, a hot rolled steel sheet may be manufactured. A method for manufacturing the hot rolled steel sheet is not specifically limited and the hot rolled steel sheet may be manufactured according to general methods therefor. In an embodiment of the present invention, the steel sheet may be manufactured by reheating the steel slab at 1,100° C. to 1,300° C., subjecting the reheated steel slab to hot finish rolling at a temperature not lower than the Ar3 transformation point but not higher than 900° C., and coiling the hot-rolled steel sheet at 650° C. to 700° C.

A cold rolled steel sheet may be manufactured by pickling and cold rolling the manufactured hot-rolled steel sheet. While the cold rolling reduction ratio after pickling is not limited, the lower limit may be preferable about 30% because when it is too low, it is difficult to obtain a desired thickness and to correct the shape of the steel sheet. When the cold rolling reduction ratio is higher than 80%, there is a high possibility that cracking may occur at edges of the steel sheet and a load during the cold rolling may be induced. Thus, the reduction ratio may preferably be 80% or less.

After a heat treatment of the cold rolled steel sheet, Al coating is performed thereon. By performing Al coating after the heat treatment of the cold rolled steel sheet, a steel sheet having excellent heat resistance and surface characteristics can be manufactured. The Al coating method is not particularly limited and examples thereof include hot dipping, electrocoating, vacuum deposition coating, and cladding. However, hot dipping is most economically useful.

MODE FOR INVENTION

Exemplary embodiments of the present invention will now be described in detail.

EXAMPLES

Steel slabs having the composition as set forth in Table 1 were subjected to vacuum melting, and heating in a heating furnace in a temperature range of 1,150° C. to 1,250° C. for 1 hour, followed by hot rolling. The hot rolling was terminated at a temperature of 890° C. to 920° C. Coiling was performed at 700° C. Then, the hot rolled steel sheets were subjected to pickling and cold rolling at a cold-rolling reduction ratio of 75%, and then, the cold rolled steel sheets were subjected to hot dip aluminizing.

For the hot dip aluminizing, the degreased cold rolled steel sheets were heat-treated in a reducing atmosphere of nitrogen and hydrogen (the hydrogen concentration of 30%) at a dew point temperature of −40° C. and the maximum reduction annealing heat treatment temperature was 820° C. After heat treatment, the steel sheets were cooled to 680° C. and soaked for certain time, and then dipped in a coating bath remained at 680° C. to be coated.

The coating bath was composed of 8.5 wt % of Si and the balance Al. To secure a coating thickness of 20 to 30 μm per side, gas wiping was performed. Thereafter, the coated specimens were subjected to a cooling apparatus and the surface spangle of the hot dip aluminum coated steel sheets was adjusted to the minimum.

TABLE 1

| Steel species | C | Si | Mn | P | S | Soluble Al | Cu | Ni | N | Nb |
|---|---|---|---|---|---|---|---|---|---|---|
| Inventive Steel 1 | 0.002 | 0.15 | 0.4 | 0.014 | 0.012 | 0.044 | 0.2 | 0.2 | 0.003 | 0.04 |
| Inventive Steel 2 | 0.004 | 0.2 | 0.4 | 0.015 | 0.010 | 0.041 | 0.2 | 0.4 | 0.003 | 0.05 |
| Inventive Steel 3 | 0.002 | 0.2 | 0.5 | 0.011 | 0.015 | 0.047 | 0.4 | 0.3 | 0.003 | 0.03 |
| Inventive Steel 4 | 0.003 | 0.05 | 0.5 | 0.010 | 0.010 | 0.048 | 0.2 | 0.5 | 0.003 | 0.05 |
| Inventive Steel 5 | 0.002 | 0.08 | 0.3 | 0.015 | 0.008 | 0.057 | 0.3 | 0.4 | 0.003 | 0.03 |
| Comparative Steel 1 | 0.018 | 0.2 | 0.5 | 0.012 | 0.010 | 0.035 | 0.01 | 0.04 | 0.003 | 0.02 |
| Comparative Steel 2 | 0.003 | 0.5 | 0.03 | 0.011 | 0.012 | 0.036 | 0.02 | 0.3 | 0.003 | 0.04 |

TABLE 1-continued

| Steel species | C | Si | Mn | P | S | Soluble Al | Cu | Ni | N | Nb |
|---|---|---|---|---|---|---|---|---|---|---|
| Comparative Steel 3 | 0.003 | 0.01 | 0.4 | 0.014 | 0.013 | 0.050 | 0.01 | 0.02 | 0.003 | 0.04 |
| Comparative Steel 4 | 0.004 | 0.09 | 0.4 | 0.013 | 0.009 | 0.048 | 0.01 | 0.01 | 0.003 | 0.04 |
| Comparative Steel 5 | 0.003 | 0.10 | 0.2 | 0.009 | 0.014 | 0.049 | 0.2 | 0.01 | 0.003 | 0.002 |

To evaluate the heat resistance properties of the hot dip aluminum coated steel sheets manufactured as above, a tensile test was conducted at 700° C. and the high temperature yield strengths were measured and shown in Table 2. To evaluate the oxidation resistant properties, the steel sheets manufactured as above were weighed and heated in muffle furnaces in, which temperatures were kept at 700° C. and 800° C., respectively, for 48 hours and then subjected to air cooling. The above experiment, as one cycle, was conducted repeatedly for 5 cycles and the weight gains were measured. The results thereof are shown in Table 2. The weight gain indicates that amount of the FeAl alloy layer formation was increased. Therefore, superiority of the adhesion can be determined from the weight gain measurements.

In addition, the specimens which were heat-treated up to 5 cycles were subjected to 180° bending processing (0t bending) and then to the high temperature adhesion test and the surface appearances were observed and the results thereof are shown in Table 2. From the observation results, ⊚ means very good, ○ means good, Δ means average, and x means poor.

adhesion and the coating layers were not peeled at high temperatures of up to 800° C. and the adhesion at high temperatures was excellent.

Meanwhile, oxidation resistance at high temperature was measured in each cycle and from the results as shown in Table 2, it was found that the examples of the present invention exhibited excellent oxidation resistance. However, from in the comparative examples which were out of the range of the present invention, excessive oxidation occurred and oxidation resistance was inferior.

Figure 2:
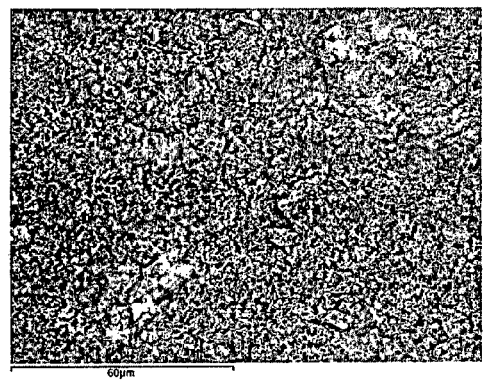
FIG. 2(a) and FIG. 2(b) are photographs showing the surface morphology of inventive steel 1 and comparative steel 1 after heat treatments at high temperature.
Figure 2:

Meanwhile, after conducting 5 cycles, cross-sectional microstructures of the coating layers of the inventive steel 1 and the comparative steel 1 were compared. FIG. 1 shows the results of the adhesion tests after heat treatment of the inventive steel 1 and the comparative steel 1 at high temperature as cross-sectional microstructures of the coating layers and FIG. 2 shows the surface morphology of the inventive steel 1 and the comparative steel 1 after heat treatment at high temperature, respectively. As shown in FIG. 1(a), in the inventive steel 1, a cracking occurrence between the steel substrate and the

TABLE 2

| Steel species | High temp. YP (MPa) | Oxidation resistance (g/m$^2$) | | Mechanical properties (room temp.) | | Adhesion | | Surface appearance |
|---|---|---|---|---|---|---|---|---|
| | | 700° C. | 800° C. | YP(MPa) | TS(MPa) | Room temp. | 800° C. | |
| Inventive Steel 1 | 73 | 15 | 40 | 175 | 370 | ⊚ | ⊚ | ⊚ |
| Inventive Steel 2 | 71 | 18 | 42 | 172 | 365 | ⊚ | ⊚ | ⊚ |
| Inventive Steel 3 | 70 | 20 | 45 | 178 | 378 | ⊚ | ⊚ | ⊚ |
| Inventive Steel 4 | 75 | 17 | 44 | 170 | 360 | ⊚ | ⊚ | ⊚ |
| Inventive Steel 5 | 72 | 16 | 40 | 168 | 365 | ⊚ | ⊚ | ⊚ |
| Comparative Steel 1 | 55 | 35 | 60 | 325 | 380 | ⊚ | Δ | ○ |
| Comparative Steel 2 | 50 | 37 | 62 | 189 | 398 | Δ | ○ | X |
| Comparative Steel 3 | 45 | 40 | 65 | 170 | 362 | ⊚ | Δ | ○ |
| Comparative Steel 4 | 42 | 36 | 70 | 165 | 385 | ⊚ | Δ | ○ |
| Comparative Steel 5 | 50 | 32 | 67 | 251 | 358 | ⊚ | ○ | Δ |

As shown in Table 2, the high temperature yield strengths at 700° C. of the inventive steels of the present invention were 70 MPa or more and it was found that the inventive steels exhibited excellent high temperature strength. However, the comparative steels under same condition fell behind the inventive steels.

As the results of the measurements of the surface appearances and coating adhesion, it was found that all of the inventive steels secured excellent surface appearances, coating coating layer was small even after heat treatment and the result was favorable. However, in the comparative steel 1 in FIG. 1(b), it was found that the cracking occurrence between the steel substrate and the coating layer was large and peeling occurred.

While in the inventive steel 1 of FIG. 2(a), fine granular microstructure on the surface was uniformly observed even after heat treatment, the comparative steel 1 of FIG. 2(b) showed coarse powdered microstructure. As a result of analyzing the surfaces, the inventive steel 1 showed low Fe of 9.4%, while the comparative steel 1 showed 14.9% of Fe. Like this, the reason for which an Fe concentration was low in the inventive steel was that the CuNi—(AlSiFe) intermetallic compound produced at the interface inhibited the Fe diffusion of the steel substrate.

The invention claimed is:

1. An aluminum coated steel sheet having excellent oxidation resistance and heat resistance, comprising: an aluminum coating layer formed on a surface of a steel sheet which comprises 0.001 to 0.015 wt % of carbon (C), 0.05 to 0.3 wt % of silicon (Si), 0.1 to 0.6 wt % of manganese (Mn), 0.01 to 0.05 wt % niobium (Nb), 0.01 wt % or less of phosphorus (P), 0.01 wt % or less of sulfur (S), 0.1 wt % or less of soluble aluminum (Al), 0.05 to 0.5 wt % of copper (Cu), 0.05 to 0.5 wt % nickel (Ni), 0.001 to 0.01 wt % of nitrogen (N), and the balance of Fe and inevitable impurities; and an alloy layer which comprises an intermetallic compound at an interface between the steel sheet and the aluminum coating layer, wherein the intermetallic compound is a Cu—Ni—Fe(—Al—Si)-based intermetallic compound.

2. The aluminum coated steel sheet of claim 1, wherein the alloy layer has a thickness of about 3 μm or less.

3. The aluminum coated steel sheet of claim 1, wherein the aluminum coating layer comprises 5 to 11 wt % of silicon (Si) and the balance of aluminum (Al) and inevitable impurities.

4. The aluminum coated steel sheet of claim 1, wherein the aluminum coating layer comprises 10 wt % or less of iron (Fe) and 50 wt % or more of aluminum (Al).

5. The aluminum coated steel sheet of claim 1, wherein the aluminum coating layer has a thickness of 10 μm to 30 μm.

* * * * *